(12) United States Patent
Naden

(10) Patent No.: US 8,138,736 B2
(45) Date of Patent: Mar. 20, 2012

(54) POWER SYSTEM HAVING A LOCAL SENSE CONTROL DOMINANT OVER A REMOTE SENSE CONTROL TO AVOID EFFECTS OF INTERCONNECTION FAILURE MODES

(75) Inventor: Mark Naden, Tucson, AZ (US)

(73) Assignee: Securaplane Technologies, Inc., Tucson, AZ (US)

( * ) Notice: Subject to any disclaimer, the term of this patent is extended or adjusted under 35 U.S.C. 154(b) by 604 days.

(21) Appl. No.: 12/356,146

(22) Filed: Jan. 20, 2009

(65) Prior Publication Data
US 2010/0181971 A1 Jul. 22, 2010

(51) Int. Cl.
*G05F 1/00* (2006.01)
(52) U.S. Cl. ..... 323/285; 323/284; 323/909; 363/56.05; 361/18
(58) Field of Classification Search ........... 323/284, 323/285, 351, 909; 307/4; 361/18
See application file for complete search history.

(56) References Cited

U.S. PATENT DOCUMENTS

| | | | |
|---|---|---|---|
| 4,616,302 A | 10/1986 | Mandelcorn | |
| 4,651,020 A | 3/1987 | Kenny et al. | |
| 5,298,851 A | 3/1994 | DeNardis | |
| 5,894,413 A * | 4/1999 | Ferguson | 363/65 |
| 5,977,757 A | 11/1999 | Felps | |
| 6,504,423 B2 | 1/2003 | Riggio et al. | |
| 6,570,746 B1 | 5/2003 | Smith | |
| 6,881,106 B1 | 4/2005 | Gonring | |
| 6,950,322 B2 | 9/2005 | Ferens | |
| 7,212,012 B1 * | 5/2007 | Zhang | 324/611 |
| 7,282,921 B2 | 10/2007 | Sela et al. | |
| 7,327,123 B2 | 2/2008 | Faberman et al. | |

OTHER PUBLICATIONS

Jimmie D. Felps, Automatic local sensing improves regulation, EDN Access for Design, by Design, Jan. 4, 1996.

* cited by examiner

*Primary Examiner* — Matthew Nguyen
*Assistant Examiner* — Zekre Tsehaye
(74) *Attorney, Agent, or Firm* — Knobbe Martens Olson & Bear, LLP

(57) ABSTRACT

A power system is configured to provide a regulated voltage to an electrical load connected to a power source through at least one power line. The power system includes a first voltage control loop based on a remote sense signal indicative of voltage level at the load. The power system further includes a second voltage control loop based on a local sense signal indicative of a level of output voltage at the power source. The voltage level of the local sense signal is generally at a higher voltage level relative to the voltage level of the remote sense signal. Circuitry is configured to pass just the signal with the higher voltage level to ensure that the local sense control loop is a dominant control loop with respect to the remote sense control loop. This avoids effects on the power source from one or more failure modes that can occur in interconnections of the system.

19 Claims, 1 Drawing Sheet

POWER SYSTEM HAVING A LOCAL SENSE CONTROL DOMINANT OVER A REMOTE SENSE CONTROL TO AVOID EFFECTS OF INTERCONNECTION FAILURE MODES

FIELD OF THE INVENTION

The invention is generally directed to electrical power systems, and, more particularly, to a power system configured with a local sense control dominant over a remote sense control to avoid effects of one or more failure modes that can occur in interconnecting lines of the system.

BACKGROUND OF THE INVENTION

A power source, such as a power converter, may be used in a power system to provide substantially accurate voltage regulation for an electrical load. Often it may be desirable to provide such voltage regulation directly at the load. This regulation technique is generally referred in the art as point of load regulation. One example application may be a battery charger system where the load (e.g., a battery) may be temperature sensitive. Another example application that may involve sensitive loads may be a computer system.

The power converter supplies output current through one or more power lines to the load. In operation, the flow of current causes a voltage drop along the lines connected from the power converter to the load due to the impedance of the conducting lines. As noted above, it may be desirable to regulate the voltage at the point of load (as opposed to the power converter output) to provide accurate voltage regulation at the load. To account for the voltage drop across the power lines, the voltage at the converter output may be set relatively higher than the nominal voltage of the load.

Voltage feedback techniques generally used for the voltage regulation typically incorporate two voltage sensing loops, known as remote-sense and local-sense respectively. The remote-sense loop may provide a pair of sense lines (e.g., positive and negative lines) connected directly at the point of load for feedback information of the load voltage and the local-sense loop may be constructed in the power converter (e.g., at the terminal outputs the power converter) to provide feedback information in connection with the terminal voltage of the power converter.

Traditionally, it is known to use the remote-sense loop as the dominant control loop over the local-sense loop. For example, this technique allows the system to automatically switch to local regulation if the remote-sense lines were accidentally disconnected. This technique generally works well under normal operation or if the remote sense leads are accidentally removed. However, this feedback methodology has no provision to account for other failure modes, such as electrical open power lines or electrically shorted remote sense leads. Under such conditions the power converter may operate in an uncontrolled condition resulting in an undesirable high voltage output that can lead to system shutdown and/or failure of components.

BRIEF DESCRIPTION OF THE DRAWINGS

The invention is explained in the following description in view of the drawings that show.

DETAILED DESCRIPTION OF THE INVENTION

Figure 1:
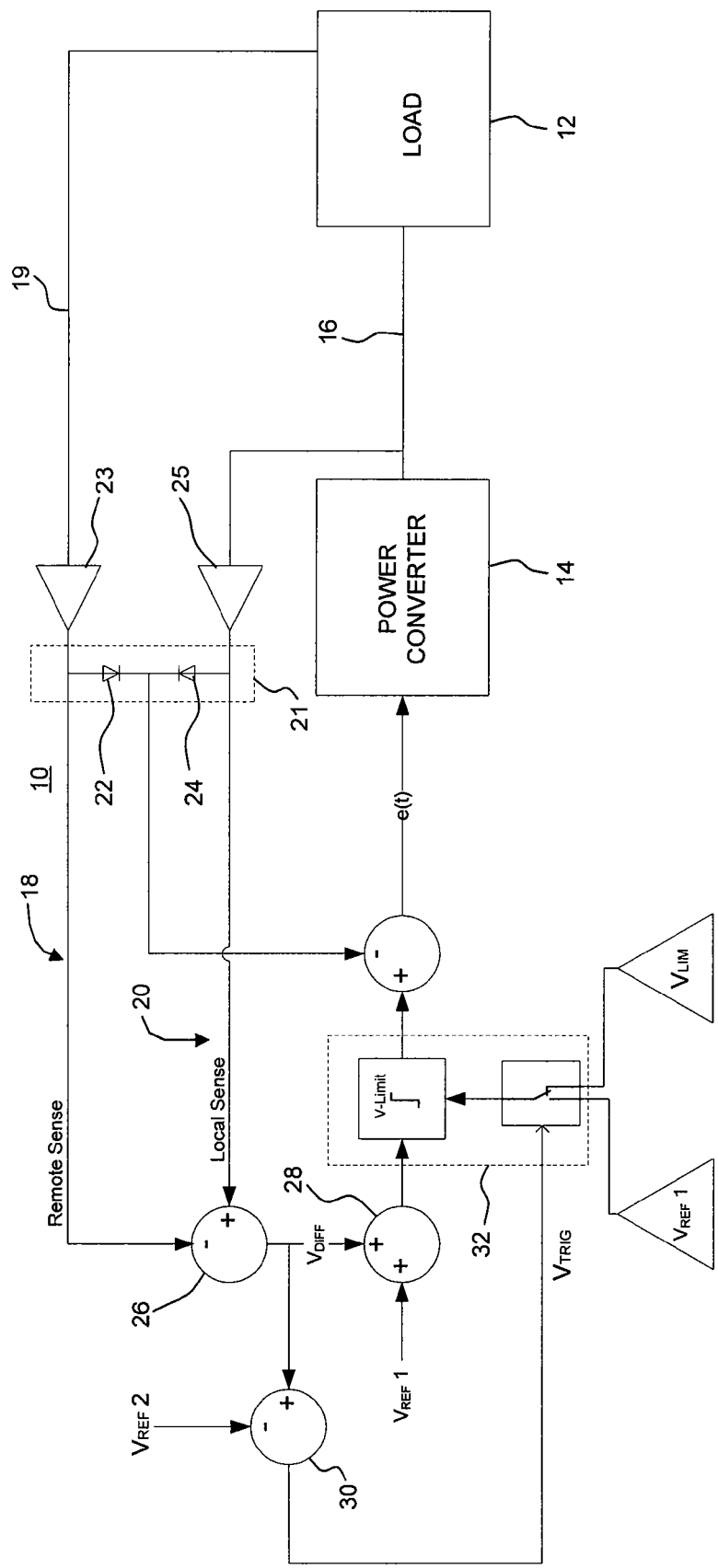
FIG. 1 is a schematic representation of an example embodiment of a power system embodying aspects of the present invention.

FIG. 1 is a schematic representation of an example embodiment of a power system 10 embodying aspects of the present invention. Power system 10 is configured to provide a regulated voltage to an electrical load 12 connected to a power source 14, such as a power converter, through at least one or more power lines 16 (just one line is shown in FIG. 1 for simplicity of illustration).

The power system 10 includes a first voltage control loop 18 based on a remote sense signal indicative of the voltage level at the load. The power system 10 further includes a second voltage control loop 20 based on a local sense signal indicative of a level of output voltage at the power source. The voltage level of the local sense signal is commonly set at a higher voltage level relative to the voltage level of the remote sense signal.

Circuitry 21 is arranged to pass just the signal with the higher voltage level (i.e., the local sense signal) to ensure that the local sense control loop is the dominant control loop with respect to the remote sense control loop. This avoids effects on the power source from one or more failure modes that can occur. An example of a failure mode may be an electrical open in the power line 16. Another example of a failure mode may be an electrical short in a remote sense line 19.

In one example embodiment, circuitry 21 may include a first diode 22 connected to receive the remote sense signal, such as may be received by way of a first operational amplifier 23. Circuitry 21 may further include a second diode 24 connected to receive the local sense signal, such as may be received by way of a second operational amplifier 25. It will be appreciated that the first and second diodes are mutually connected to one another to pass the signal with the higher voltage level (i.e., the local sense signal).

A combiner 26 is arranged to combine the remote sense signal and the local sense signal to supply a signal indicative of a difference ($V_{DIFF}$) between the remote sense signal and the local sense signal. For example, if the local sense signal is 12.5 V and the remote signal is 12 V, then $V_{DIFF}$=0.5 V. That is, in this example the voltage drop to be compensated would be 0.5 V.

A combiner 28 is arranged to combine the signal indicative of the difference ($V_{DIFF}$) between the remote sense signal and the local sense signal and a first reference signal ($V_{REF1}$) to supply a reference signal compensated for the voltage drop that occurs in the power line 16.

A comparator 30 is coupled to receive the signal indicative of the difference ($V_{DIFF}$) between the remote sense signal and the local sense signal and a second reference signal ($V_{REF2}$) to supply a trigger signal ($V_{TRIG}$) when the value of the difference exceeds the value of the second reference signal.

A limiter 32 is coupled to receive from combiner 28 the signal compensated for the voltage drop. The limiter 32 is configured to apply to the compensated signal a selectable voltage limit from at least two voltage limit choices (e.g., $V_{REF1}$ and $V_{LIM}$). The selectable voltage limit applied to the compensated signal is chosen to avoid the effects on the power source of a respective failure mode, such as can occur in the interconnection between the power source and the load.

A combiner 33 is arranged to combine a voltage-limited (e.g., clamped) signal supplied by the limiter 32 and the signal passed by the circuitry 21 to supply a difference signal (error signal e(t)) to control the output voltage of the power source 14 using, for example, a power modulation technique known by one skilled in the art, such as pulse-width modulation or any other such modulation technique.

Limiter 32 is responsive to the trigger signal ($V_{TRIG}$) supplied by comparator 30 when the value of the difference signal ($V_{DIFF}$) exceeds the value of the second reference signal ($V_{REF2}$) so that the selectable voltage limit applied by the limiter to the compensated signal from combiner 28 is set (e.g., clamped) to the voltage level of the first reference signal ($V_{REF1}$). Conversely, when the value of the difference signal ($V_{DIFF}$) is below the value of the second reference signal, the selectable voltage limit applied by the limiter to the compensated signal is set (e.g., clamped) to a predefined voltage level ($V_{LIM}$) that is higher than the level of the first reference signal. The latter described operation comprises the default mode of operation of limiter 32. That is, during normal system operation the voltage limit applied by the limiter to the compensated signal is clamped to the predefined voltage level ($V_{LIM}$).

In one example embodiment, the value of the predefined voltage level ($V_{LIM}$) may be selected to be moderately above the nominal voltage of the load. That is, to a voltage level within appropriate tolerances of applicable system components. In one example application for a 12V battery load, the predefined voltage level ($V_{LIM}$) was selected to be 15 V.

For example, in the event of an electrical short in the remote sense line, then the value of signal $V_{DIFF}$ would become relatively higher (than an expected line voltage drop, e.g., 0.5 V) since the remote sense signal would be at 0 V due to the short. Under the foregoing example conditions, the trigger signal would be set to a logic one so that the voltage limiter clamps the signal supplied to combiner 33 to the value of $V_{REF1}$. This voltage clamping avoids the power converter 14 from uncontrollably driving the output voltage to a lasting over-voltage condition and causing possible failure of converter components and/or load due to the over-voltage condition.

In another example of a failure mode, in the event of an electrical open in one or more of the power lines that connect the load 12 to the power converter 14, even though no power is delivered to the load due to the open, the system may sense one voltage level at the remote sense and a different voltage at the local sense. Let us say, the load voltage could be 11.5 V and the local voltage could be 12 V, and under this example fault mode scenario, the voltage differential is still sufficiently small so that the remote sense information may not be indicative of a malfunction. Accordingly, if the voltage-limiting provided by circuit 32 was not available, the power converter would still continue to try to supply the power to the load, even though there is no power being dissipated by the load due to the open, which could lead to a system shutdown requiring a cycled restart and/or possible failure of converter output components due to excess power build-up at the output stage of the power converter. As noted above, in the default mode the trigger signal is set to a logic zero so that under this failure mode scenario the voltage limiter clamps the signal supplied to combiner 33 to the value of $V_{LIM}$, thus ensuring that the converter will not exceed ($V_{LIM}$). In one example system, as may be configured for a 12V battery application, $V_{REF1}$ was set to 12V, $V_{REF2}$ was set to 1.0 V and $V_{LIM}$ was set to 15 V.

TABLE 1

Comparative example capabilities of a power converter embodying aspects of the present invention under various failure modes

| Failure Mode | Prior Art | Power Converter Embodying Aspects Of The Present Invention |
| --- | --- | --- |
| Remote-Sense line fails open (or is unintentionally disconnected) | Power converter will automatically switch to Local-Sense mode Impact: None | Power converter will automatically switch to Local-Sense mode Impact: None |
| Electrical short occurs in Remote-Sense line | Power converter will drive the output voltage as high as possible. This will occur since the Remote-Sense loop is the dominant loop and during this failure mode this loop senses a zero voltage. Potential Impact: Possible failure on converter output components and load due to over-voltage. | Power converter will automatically switch to Local-Sense mode with output voltage clamped to a nominal reference voltage. Impact: None |
| Electrical open occurs in at least one power line | Power converter will drive the output voltage as high as possible. This will occur since the converter will uncontrollably continue to generate power, although such power is not dissipated by the load with the open power line(s). Potential Impact: Possible failure on converter output components due to over-voltage. Output voltage shutdown requiring cycled restart. | Power converter includes a default mode where the output voltage is automatically clamped to a value within appropriate tolerances of applicable components of the system. Impact: None |

In operation, in the event of a failed remote-sense line (e.g., open or short-circuit), a voltage regulation arrangement embodying aspects of the present invention will continue to regulate the output voltage at or near a desired set point value while avoiding any lasting over-voltage condition, in contrast to prior art feedback techniques. Similarly, if the power line connection between the power converter and the load becomes electrically open, the converter is configured to automatically regulate its output to a voltage level within appropriate tolerances of applicable system components.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

The invention claimed is:

1. A power system configured to provide a regulated voltage to an electrical load connected to a power source through at least one power line, the power system comprising:
   a first voltage control loop based on a remote sense signal indicative of voltage level at the load;
   a second voltage control loop based on a local sense signal indicative of a level of output voltage at the power source, wherein the voltage level of the local sense signal comprises a higher voltage level relative to the voltage level of the remote sense signal;
   a combiner arranged to combine the remote sense signal and the local sense signal to supply a signal indicative of a difference between the remote sense signal and the local sense signal; and
   circuitry configured to pass just the signal with the higher voltage level to ensure that the local sense control loop is a dominant control loop with respect to the remote sense control loop, thereby avoiding effects on the power source from a failure mode occurring in an interconnection of the system.

2. The power system of claim 1, further comprising a combiner arranged to combine a first reference signal with the signal indicative of the difference between the remote sense signal and the local sense signal to supply a signal compensated for a voltage drop that occurs in said at least one power line.

3. The power system of claim 2, further comprising a comparator coupled to receive a second reference signal and the signal indicative of the difference between the remote sense signal and the local sense signal to supply a trigger signal when the value of the difference exceeds the value of the first reference signal.

4. The power system of claim 3, further comprising a limiter coupled to receive the signal compensated for the voltage drop, wherein the limiter is configured to apply to the compensated signal a selectable voltage limit from at least two voltage limit choices.

5. The power system of claim 4, further comprising a combiner arranged to combine a voltage-limited signal supplied by the limiter and the signal passed by the circuitry to supply a difference signal to control the output voltage of the power source.

6. The power system of claim 4, wherein the selectable voltage limit applied to the compensated signal is chosen to avoid the effects on the power source of a respective failure mode occurring in an interconnection between the power source and the load.

7. The power system of claim 6, wherein the limiter is responsive to the trigger signal supplied when the value of the difference exceeds the value of the second reference Signal so that the selectable voltage limit applied by the limiter to the compensated signal is set to the voltage level of the first reference signal.

8. The power system of claim 6, wherein when the value of the difference is below the value of the second reference signal, the selectable voltage limit applied by the limiter to the compensated signal is set to a predefined voltage level that is higher than the level of the first reference Signal.

9. The power system of claim 7, wherein the respective failure mode comprises an electrical short in a remote sense line.

10. The power system of claim 8, wherein the respective failure mode comprises an electrical open in said at least one power line.

11. The power system of claim 1, wherein the power source comprises a power converter.

12. The power system of claim 1, wherein the circuitry comprises a first diode connected to receive the remote sense signal and a second diode connected to receive the local sense signal, wherein the first and second diodes are mutually connected to one another to pass the signal with the higher voltage level.

13. A power system configured to provide a regulated voltage to an electrical load connected to a power source through at least one power line, the power system comprising:
   a first voltage control loop based on a remote sense signal indicative of voltage level at the load;
   a second voltage control loop based on a local sense signal indicative of a level of output voltage at the power source;
   circuitry configured to pass just the local sense signal;
   a combiner arranged to differentially combine a voltage-limited signal and the passed local sense signal to supply a signal to control the output voltage of the power source, the voltage-limited signal comprising a signal compensated to account for a voltage drop that occurs in said at least one power line based on the level of the remote sense signal, wherein the voltage limit applied to the compensated signal is selectable from at least two voltage limit choices to avoid effects on the power source of a respective failure occurring in an interconnection of the system.

14. The power system of claim 13, further comprising a combiner arranged to combine the remote sense signal and the local sense signal to supply a signal indicative of a difference between the remote sense signal and the local sense signal, and a combiner arranged to combine a first reference signal with the signal indicative of the difference between the remote sense signal and the local sense signal to supply the signal compensated for the voltage drop that occurs in said at least one power line.

15. The power system of claim 14, further comprising a comparator coupled to receive a second reference signal and the signal indicative of the difference between the remote sense signal and the local sense signal to supply a trigger signal when the value of the difference exceeds the value of the first reference signal.

16. The power system of claim 15, further comprising a limiter coupled to receive the compensated signal to apply the selectable voltage limit to the compensated signal, wherein the limiter is responsive to the trigger signal supplied when the value of the difference exceeds the value of the second reference signal so that the selectable voltage limit applied to the compensated signal is set to the voltage level of the first reference signal, and, further wherein, when the value of the difference is below the value of the second reference signal, the selectable voltage limit applied by the limiter to the compensated signal comprises a predefined voltage level higher than the level of the first reference signal.

17. The power system of claim 16, wherein the respective failure mode is selected from the group consisting of an electrical short in a remote sense line and an electrical open in said at least one power line.

18. The power system of claim 13, wherein the power source comprises a power converter.

19. The power system of claim 13, wherein the circuitry comprises a first diode connected to receive the remote sense signal and a second diode connected to receive the local sense signal, wherein the first and second diodes are mutually connected to one another to pass the signal with the higher voltage level.

* * * * *

UNITED STATES PATENT AND TRADEMARK OFFICE
CERTIFICATE OF CORRECTION

PATENT NO.       : 8,138,736 B2
APPLICATION NO.  : 12/356146
DATED            : March 20, 2012
INVENTOR(S)      : Mark Naden Page 1 of 1

It is certified that error appears in the above-identified patent and that said Letters Patent is hereby corrected as shown below:

In claim 8, at column 5, line 49, please delete "Signal" and insert --signal--, therefor.

In claim 9, at column 5, line 56, please delete "Signal." and insert --signal.--, therefor.

Signed and Sealed this
Thirty-first Day of July, 2012

David J. Kappos
*Director of the United States Patent and Trademark Office*